UNITED STATES PATENT OFFICE.

CHARLES ELLERY AVERY, OF JACKSONVILLE, FLORIDA.

METHOD OF GENERATING CARBONIC-ACID GAS.

SPECIFICATION forming part of Letters Patent No. 316,863, dated April 28, 1885.

Application filed October 3, 1884. (No specimens.)

*To all whom it may concern:*

Be it known that I, CHARLES ELLERY AVERY, a citizen of the United, States, residing at Jacksonville, in the county of Duval and State of Florida, have invented certain new and useful Improvements in the Manufacture of Aerated or Carbonated Waters or Beverages, known as "Soda-Waters," "Mineral Waters," "Ginger-Ale," &c.; and I do hereby declare that the following is a full, clear, and exact description of the invention, which will enable others skilled in the art to which it appertains to make and use the same.

Heretofore soda or aerated or carbonated waters or beverages have been made on the large scale by the reaction of mineral acids on the carbonate of lime—such as marble-dust or whiting—or on the small scale by the reaction of tartaric acid on carbonate of lime or the carbonate or bicarbonate of potash or soda. The first reaction is a cheap one in the cost of the chemicals used, but requires skilled labor; the products of the factories must be carried long distances in heavy, strong vessels called "fountains;" the bottled form also entails heavy weight of boxes and glass with long transport. To make the cost of transportation lighter and the handling ready, the tanks or fountains must be skillfully built of costly materials. A fountain cannot always be obtained when it is desired in out-of-the-way places, nor is it safe to make one with untrained labor, as the cheap acids—such as sulphuric or chlorhydric—are dangerous to person and property. The gasogenes for private use that use tartaric acid to react with saleratus or the carbonates of the alkalies or the carbonate of lime are costly to use from the high price of tartaric acid.

The object of my invention is to cheaply generate carbonic-acid gas with a heavy pressure, so as to charge these beverages with the gas without the use of dangerous chemicals requiring special skill. The first cost by my process is greater than by the ordinary process in the chemicals used; but the beverages may be made on the spot, and by unskilled people, saving costs in transport, skilled labor, and profits much greater than the additional cost of the chemicals.

Small-size machines may be readily built for household use to make soda-water, &c., by my process, much resembling the French gasogenes. The chemicals used can be obtained in any village or hamlet in the country, so the supply cannot fail. The chemicals can be kept mixed and ready for a long time until they are wetted to induce the reaction. The apparatus used need not be costly, as its weight is of little account, since it has not to bear rough handling and long transportation. I charge the beverages with carbonic-acid gas generated under pressure by the action of alkaline bicarbonates—such as soda or potash saleratus—on the sulphate of calcium, hydrated, as in terra-alba, or dehydrated, as in plaster-of-paris, water being present to induce the reaction, and the sulphate of lime being in the powdered form.

I prefer to mix the sulphate of lime with the alkaline bicarbonates, both in the powdered form, and to wet with water to induce the reaction; but the bicarbonates may be dissolved in the water and their solution poured upon the sulphate of lime.

As to the quantities used, the terra-alba or plaster-of-paris being a very cheap material, I prefer to use it in some excess over the theoretical proportion to insure the complete decomposition of the more expensive bicarbonate; but I do not limit myself as to the proportions used, as I believe myself the first discoverer of the fact that this reaction will liberate carbonic-acid gas under sufficient pressure to charge these beverages.

The molecular weight of dehydrated sulphate of lime $CaSO_4$ is $Ca=40+S=32+O_4=64$; total, 136; of hydrated sulphate of lime, $CaSO_4+2H_2O=136+H_4=4+O_2=32$; total, 172. The molecular weight of the bicarbonate of soda, $NaHCO_3$ is $Na=23+H=1+C=12+O_3=48$; total, 84. Since one molecule of $CaSO_4$ reacts with two molecules of $NaHCO_3$ in this reaction, we must double the latter weight, which, if the reaction is theoretical, with pure materials, requires one hundred and thirty-six parts of dehydrated sulphate of lime or plaster-of-paris, or one hundred and seventy-two of hydrated sulphate of lime or terra-alba, to react with one hundred and sixty-eight parts of bicarbonate of soda or two hundred parts of bicarbonate of potash. The equation of the reaction is as follows: $CaSO_4+2NaHCO_3=CaCO_3+CO_2+Na_2SO_4+H_2O$.

I prefer to use a quantity of water once or twice as great in volume as the mixed powder of sulphate and bicarbonate to wet it and induce the reaction; but I do not confine myself to this proportion.

This mixture of calcic sulphate and alkaline bicarbonates takes the place of the usual chemicals well in soda-water generators or gasogenes, as the reaction is quiet and steady, the reagents not dangerous, they are found in every village, may be kept mixed in safety, are not dangerous if accidentally wetted, are cheap, and give a sufficient pressure of gas to charge the beverages.

I claim—

1. In the manufacture of soda-water, mineral water, ginger-ale, or other aerated or carbonated beverages, the method of generating carbonic-acid gas against pressure by the reaction of the alkaline bicarbonates or the sesquicarbonates with the plaster-of-paris or terra-alba—i. e., the sulphate of calcium or lime, hydrated or dehydrated, in the presence of water.

2. In the manufacture of soda-water, mineral water, ginger-ale, or other aerated or carbonated beverages, the method of charging the water or suitable solutions with carbonic-acid gas generated against pressure by the reaction of the alkaline bicarbonates with the sulphate of lime, hydrated or dehydrated—that is to say, either "plaster-of-paris" or "terra-alba," as they are commercially called, the reaction being induced by the presence of water.

CHARLES ELLERY AVERY.

Witnesses:
JOSEPH LEINHART,
A. C. DANIEL.